F. E. WHITE.
THREADLESS ROD OR BOLT.
APPLICATION FILED FEB. 24, 1920.
1,348,767.  Patented Aug. 3, 1920.
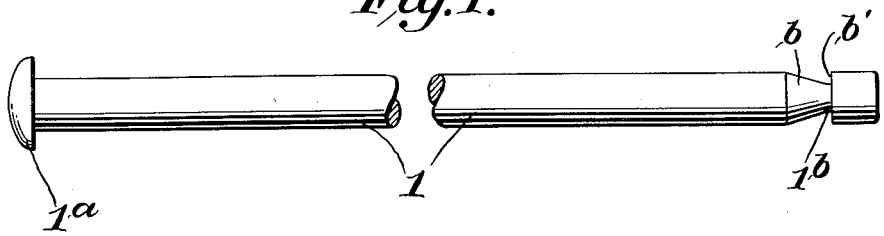
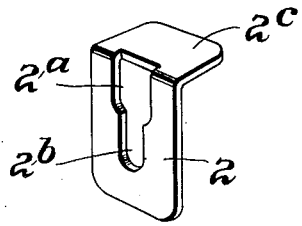
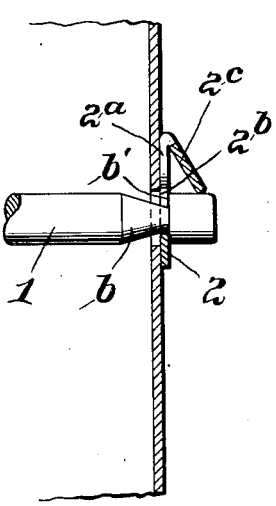
Inventor:
Fred E. White,
By Spear Middleton
Donaldson & Hall
Attorneys

UNITED STATES PATENT OFFICE.

FRED E. WHITE, OF GARDNER, MASSACHUSETTS, ASSIGNOR TO CENTRAL OIL & GAS STOVE CO., OF GARDNER, MASSACHUSETTS, A CORPORATION OF MASSACHUSETTS.

THREADLESS ROD OR BOLT.

1,348,767.    Specification of Letters Patent.    Patented Aug. 3, 1920.

Application filed February 24, 1920. Serial No. 360,902.

*To all whom it may concern:*

Be it known that I, FRED E. WHITE, a citizen of the United States, and a resident of the city of Gardner, State of Massachusetts, have invented certain new and useful Improvements in Threadless Rods or Bolts, of which the following is a specification.

My present invention relates to improvements in tie rods or bolts and aims to provide a simple, economical, durable and efficient substitute which will eliminate the necessity of using threaded nuts or similar relatively expensive fastening means.

The invention includes the novel construction hereinafter described and particularly pointed out in the appended claim.

An embodiment of the invention is illustrated in the accompanying drawings in which—

Figure 1 is a plan view of the tie rod or bolt.

Fig. 2 is a perspective view of the clip, and

Fig. 3 is a view of the clip in holding position.

Referring by reference characters to this drawing, the numeral 1 designates the tie rod or bolt which may be of any desired size or length, having an integral head $1^a$ of suitable shape at one end. At the other end it is provided with an undercut or rabbet $1^b$, preferably of the shape shown, to wit, a tapered portion $b$ ending in an abrupt shoulder $b'$. The clip, shown at 2, is formed from a sheet of metal having an opening therethrough which is provided with a portion $2^a$ corresponding in diameter to the size of the rod or bolt end to permit the passage of the latter, and a portion $2^b$ of a width fitting the under cut or reduced portion of the rod or bolt.

The clip is provided with an angularly turned flange or portion $2^c$, which, prior to application of the clip to the rod is preferably disposed approximately perpendicularly to the main portion of the clip. The clip, being made of bendable sheet metal, after it is in place upon the rod, the flange is bent down until it bears with a wedging action against the side of the rod end as shown in Fig. 3, holding the narrower portion of the opening in the undercut portion of the rod.

In this position the clip is effectually held against displacement and effectually serves the purpose of a nut and washer or upset end. The construction is capable of being manufactured at extremely low cost, and easily and quickly manipulated.

Having thus described my invention, what I claim is:

In a fastening for tie rods and the like, a rod having an undercut end portion and a fastening clip comprising a plate having an opening with a portion of a size to permit the passage of the said end and a reduced portion to engage said undercut portion, said plate having an angularly turned flange bendable into engagement with the rod end to hold the undercut portion in the reduced portion of the opening.

In testimony whereof, I affix my signature.

FRED E. WHITE.